(12) United States Patent
Dong et al.

(10) Patent No.: US 8,750,528 B2
(45) Date of Patent: Jun. 10, 2014

(54) AUDIO APPARATUS AND AUDIO CONTROLLER THEREOF

(75) Inventors: Ping Dong, Cupertino, CA (US); Qing-Guang Liu, Sunnyvale, CA (US); Wan-Chieh Pai, Taipei (TW)

(73) Assignee: Fortemedia, Inc., Sunnyvale, CA (US)

( * ) Notice: Subject to any disclaimer, the term of this patent is extended or adjusted under 35 U.S.C. 154(b) by 378 days.

(21) Appl. No.: 13/210,916

(22) Filed: Aug. 16, 2011

(65) Prior Publication Data

US 2013/0044887 A1 Feb. 21, 2013

(51) Int. Cl.
*H04R 29/00* (2006.01)
*H04R 3/00* (2006.01)

(52) U.S. Cl.
CPC .............. *H04R 3/00* (2013.01); *H04R 2400/01* (2013.01); *H04R 29/00* (2013.01)
USPC .............. 381/59; 381/56; 381/123; 381/94.1; 381/92; 381/66; 381/93

(58) Field of Classification Search
USPC .............. 381/58–59, 94.1, 94.7, 123, 56, 92, 381/122, 66, 93
See application file for complete search history.

(56) References Cited

U.S. PATENT DOCUMENTS

| 2005/0175190 A1* | 8/2005 | Tashev et al. ................ 381/92 |
| 2008/0226087 A1* | 9/2008 | Kinghorn ................... 381/59 |
| 2010/0041443 A1* | 2/2010 | Yokota .................. 455/569.2 |
| 2010/0131749 A1* | 5/2010 | Kim et al. .................. 713/100 |

* cited by examiner

*Primary Examiner* — Disler Paul
(74) *Attorney, Agent, or Firm* — McClure, Qualey & Rodack, LLP

(57) ABSTRACT

An audio apparatus is provided. The audio apparatus includes at most one electroacoustic transducer; and an audio controller, coupled to the electroacoustic transducer, for actively controlling the electroacoustic transducer to function as a loudspeaker or a microphone, wherein the loudspeaker converts output electrical signals to output sounds, and the microphone converts input sounds to input electrical signals.

20 Claims, 6 Drawing Sheets

AUDIO APPARATUS AND AUDIO CONTROLLER THEREOF

BACKGROUND OF THE INVENTION

1. Field of the Invention

The present invention relates to loudspeakers and microphones.

2. Description of the Related Art

A loudspeaker is an electrical device that converts sounds into electrical signals.

A mobile phone usually has at least one handset mode speaker, a so-called "receiver", which produces sound with low volume such that a user may listen to the sound and receive audio messages by attaching his ear to the handset mode speaker. In the modern design of a mobile phone, an additional hand-free mode speaker is usually disposed therein, which produces sound with high volume in a hand-free mode.

However, users normally use a mobile phone either in a handset mode or in a hand-free mode, and thus, either the handset mode loudspeaker or the additional handset mode loudspeaker will be idle.

It is desirable to increase the usage of the loudspeakers.

BRIEF SUMMARY OF INVENTION

A detailed description is given in the following embodiments with reference to the accompanying drawings.

The present invention provides an audio apparatus, comprising: an electroacoustic transducer; and an audio controller, coupled to the electroacoustic transducer, for actively controlling the electroacoustic transducer to function as a loudspeaker or a microphone, wherein the loudspeaker converts output electrical signals to output sounds, and the microphone converts input sounds to input electrical signals.

The present invention also provides an audio controller, coupled to an electroacoustic transducer, for actively controlling the electroacoustic transducer to function as a loudspeaker or a microphone, wherein the loudspeaker converts output electrical signals to output sounds, and the microphone converts input sounds to input electrical signals.

The present invention also provides an audio apparatus, comprising: an electroacoustic transducer; and an audio controller, coupled to the electroacoustic transducer, for actively controlling the electroacoustic transducer to function as a loudspeaker or a microphone, wherein the loudspeaker converts output electrical signals to output sounds, and the microphone converts input sounds to input electrical signals, wherein the audio controller further comprises: a spectral estimation unit for estimating the frequency spectrum of the input electrical signals converted from the input sounds when the electroacoustic transducer functions as a microphone; and a spectral calibration unit, coupled to the spectral estimation unit, for calibrating the frequency spectrum of the input electrical signals based upon a predetermined spectral characteristic.

The present invention also provides an audio apparatus, comprising: an electroacoustic transducer; and an audio controller, coupled to the electroacoustic transducer, for actively controlling the electroacoustic transducer to function as a loudspeaker or a microphone, wherein the loudspeaker converts output electrical signals to output sounds, and the microphone converts input sounds to input electrical signals, wherein the audio controller further comprising: a dynamic switching unit for switching the electroacoustic transducer to function as the loudspeaker when the electroacoustic transducer receives the output electrical signals; and switching the electroacoustic transducer to function as the microphone at the interval between two consecutive output electrical signals.

The present invention also provides an audio apparatus, comprising: an electroacoustic transducer; and an audio controller, coupled to the electroacoustic transducer, for actively controlling the electroacoustic transducer to function as a loudspeaker or a microphone, wherein the loudspeaker converts output electrical signals to output sounds, and the microphone converts input sounds to input electrical signals, wherein the audio controller further comprises: an action detection unit for detecting an action of a user, wherein the audio controller controls whether the electroacoustic transducer functions as a loudspeaker or a microphone based on the action.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
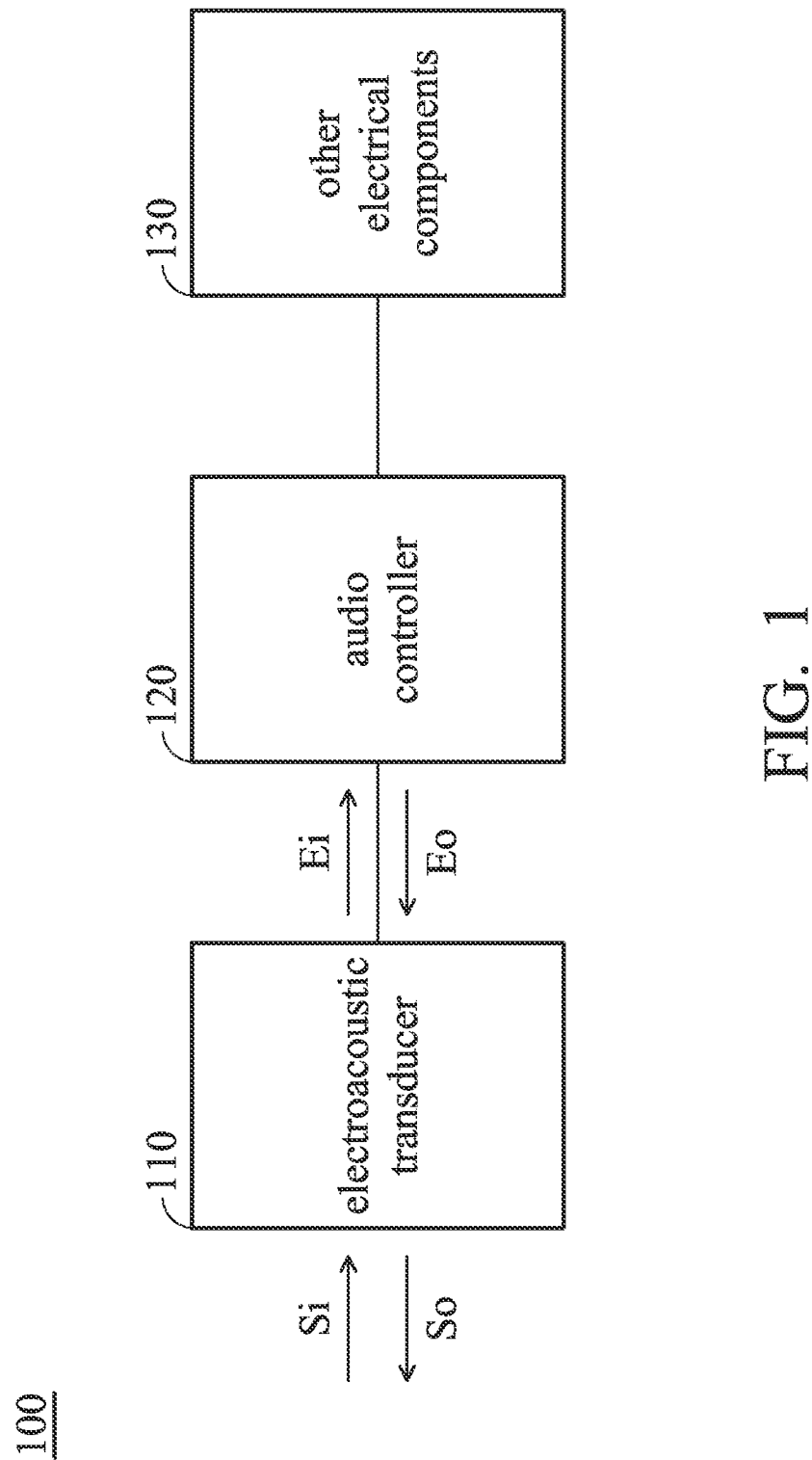
FIG. 1 is a schematic diagram of an audio apparatus according to an embodiment of the present invention.

FIG. 1 is a schematic diagram of an audio apparatus according to an embodiment of the present invention. The audio apparatus 100 of the present invention comprises an electroacoustic transducer 110 and an audio controller 120. The electroacoustic transducer 110, for example, is used as a hand-free mode loudspeaker or a hand set mode loudspeaker in a mobile phone as mentioned in Description of the related art, which is coupled to and receives output electrical signals Eo from other electrical components 130 of the mobile phone, and plays output sounds So represented by the electrical signal Eo. The audio controller 120 is coupled between the electroacoustic transducer 110 and the other electrical components 130, and used for actively controlling the electroacoustic transducer 110 to function as a loudspeaker or a microphone. In this embodiment, the electroacoustic transducer 110, when functioning as a loudspeaker, converts the output electrical signals Eo to the output sounds So, and, when functioning as a makeshift microphone, converts input sounds Si to input electrical signals Ei. The present invention provides five embodiments to describe various functions of the audio controller 120 in the following paragraphs.

(First Embodiment)

Figure 2:
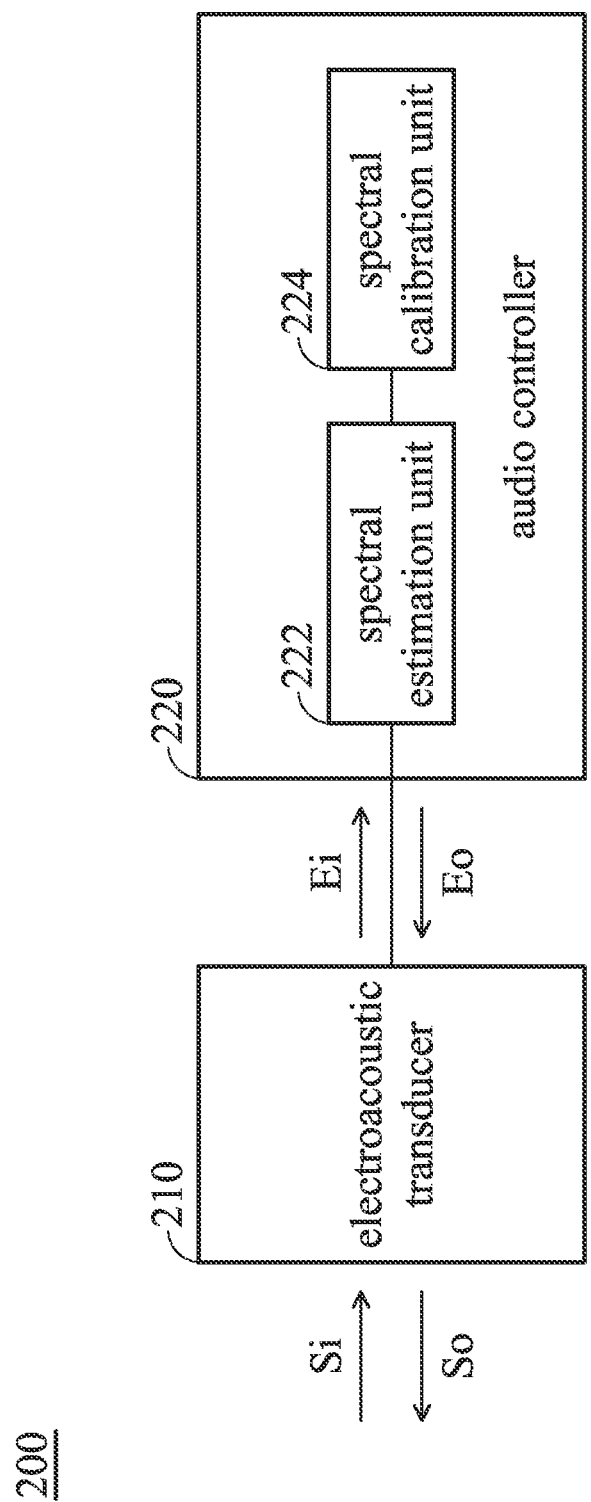
FIG. 2 is a schematic diagram of an audio apparatus according to a first embodiment of the present invention.

FIG. 2 is a schematic diagram of an audio apparatus according to a first embodiment of the present invention. In this embodiment, the audio controller 220 of the audio apparatus 200 further comprises a spectral estimation unit 222 and a spectral calibration unit 224. The audio controller 220 is coupled to an electroacoustic transducer 210, and the electroacoustic transducer 210 converts the output electrical signals Eo into the output sounds So, and converts the input sounds Si to the input electrical signals Ei.

It should be noted that although in theory a microphone that converts the input sounds into the input electrical signals is the functional opposite of a loudspeaker, a makeshift microphone usually has a different and limited frequency spectrum (frequency response) in relation to a standard microphone. Thus, the spectral estimation unit 222 and the spectral calibration unit 224 are provided in the present invention to overcome the limitation difference. When the electroacoustic transducer 210 coupled to the audio controller 220 functions as a microphone, the spectral estimation unit 222 of the present invention is used for estimating the frequency spectrum of the input electrical signals Ei converted from the input sounds Si which are received by the electroacoustic transducer 210. Then, the spectral calibration unit 224, coupled to the spectral estimation unit 222, calibrates the frequency spectrum of the input electrical signals based upon a predetermined spectral characteristic, for example, a predetermined spectral characteristic pre-stored in a memory (not shown) either separated from or integrated with the audio controller 220. Specifically, the frequency spectrum of the input electrical signals is the voltage levels of the input electrical signals in decibels over a range of frequencies (typically at least 0-20 kHz), and the predetermined spectral characteristic may be derived from the frequency spectrum of a standard microphone. Through the calibration performed by the spectral calibration unit 224, the makeshift microphone can produce input electrical signals with an ideal frequency spectrum. It should be noted that, for scientific applications, microphones with a more uniform frequency spectrum are ideal and desirable, but for other applications such as music recording, the non-uniform frequency spectrum of a microphone can produce more desirable sound qualities. Thus, the predetermined spectral characteristic is a design choice for those skilled in the art, and should not be limited to that of a uniform frequency spectrum.

(Second Embodiment)

Figure 3:
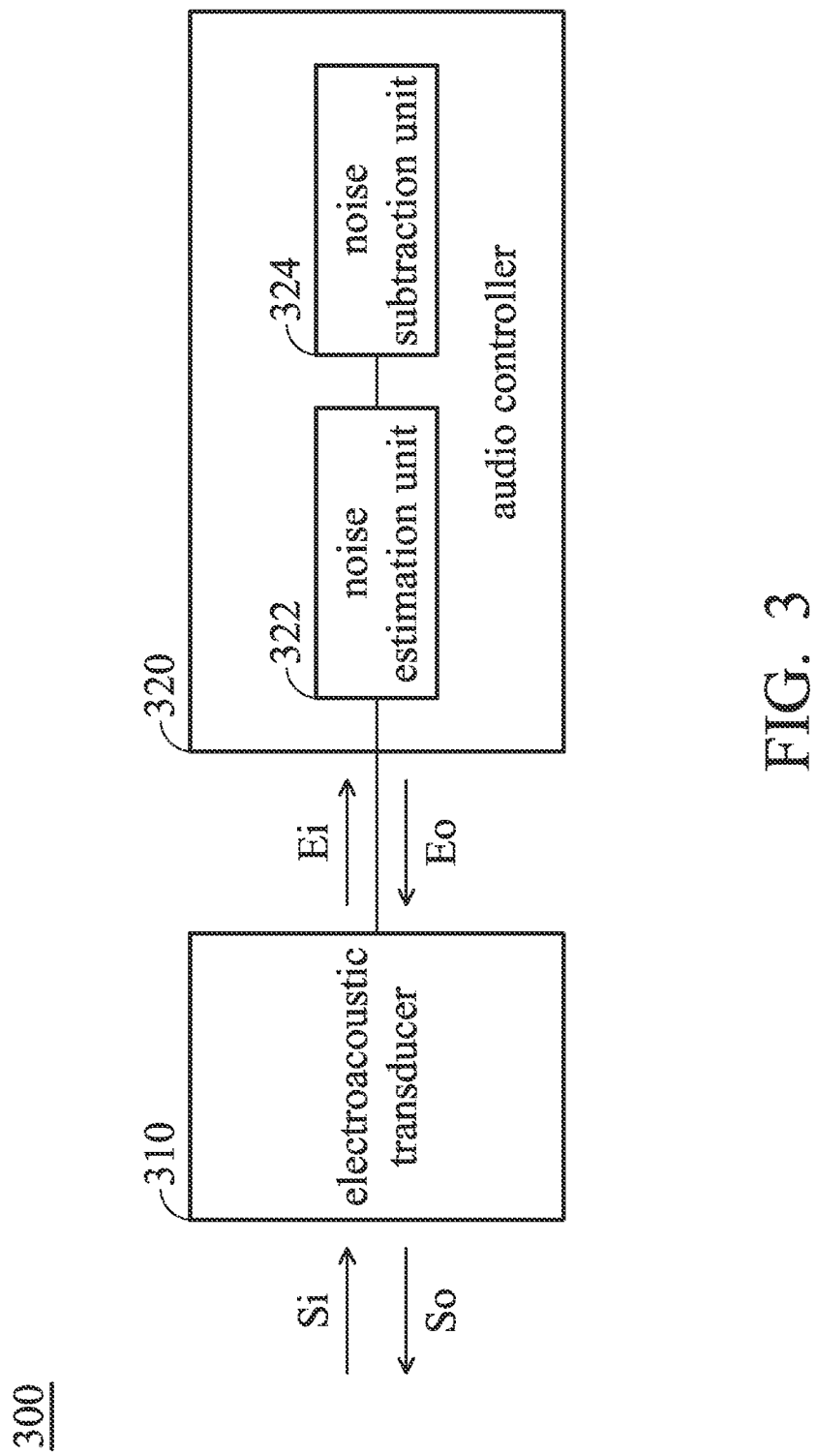
FIG. 3 is a schematic diagram of an audio apparatus according to a second embodiment of the present invention.

FIG. 3 is a schematic diagram of an audio apparatus according to a second embodiment of the present invention. In this embodiment, the audio controller 320 of the audio apparatus 300 further comprises a noise estimation unit 322 and a noise subtraction unit 324. The audio controller 320 is coupled to an electroacoustic transducer 310, and the electroacoustic transducer 310 also converts the output electrical signals Eo into the output sounds So, and converts the input sounds Si to the input electrical signals Ei.

When the electroacoustic transducer 310 functions as the microphone, the noise estimation unit 322 of the present invention estimates an ambient noise from an input sound Si, for example, using xxx technique, and produces a noise electrical signal (not shown) which represents the ambient noise. In one embodiment, the noise electrical signal is then stored in a memory either separated from or integrated with the audio controller 320. The noise subtraction unit 324, coupled to the noise estimation unit 322, can subtract the noise electrical signal from this and the other following input electrical signals when the electroacoustic transducer 310 functions as a microphone.

(Third Embodiment)

Figure 4:
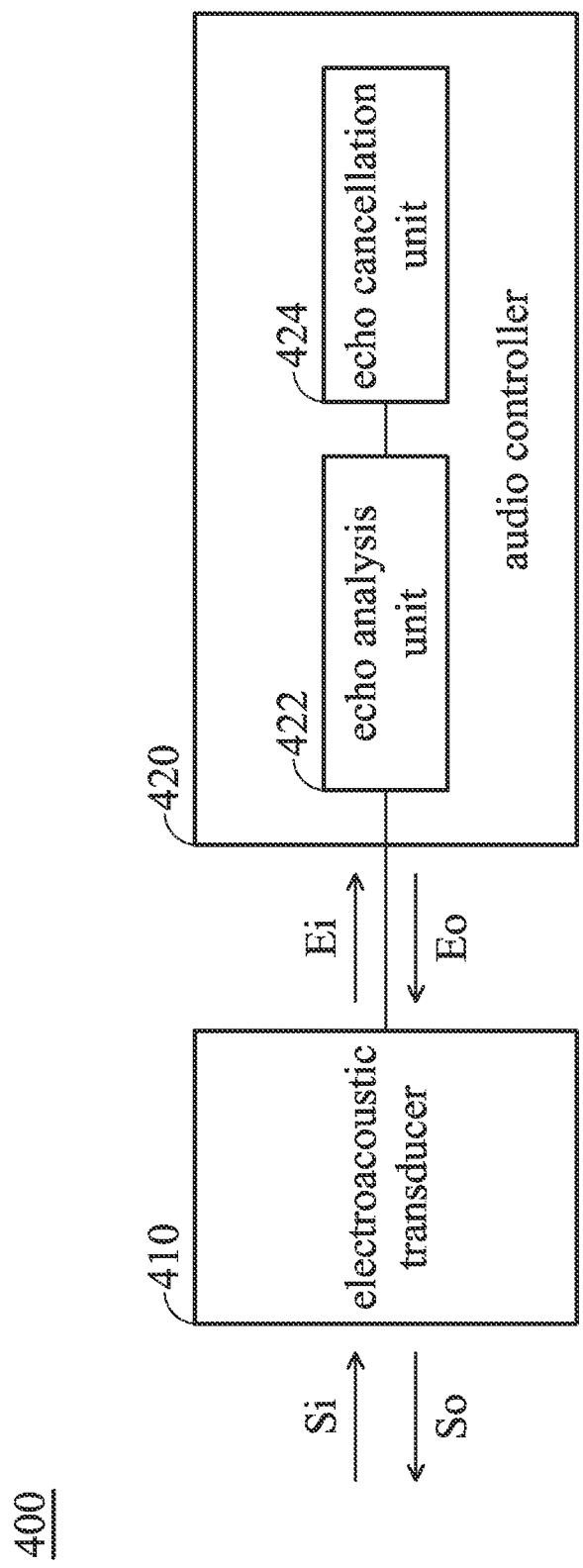
FIG. 4 is a schematic diagram of an audio apparatus according to a third embodiment of the present invention.

FIG. 4 is a schematic diagram of an audio apparatus according to a third embodiment of the present invention. In this embodiment, the audio controller 420 of the audio apparatus 400 further comprises an echo analysis unit 422 and an echo cancellation unit 424. The audio controller 420 is coupled to an electroacoustic transducer 410, and the electroacoustic transducer 410 converts the output electrical signals Eo into the output sounds So, and converts the input sounds Si to the input electrical signals Ei.

When the electroacoustic transducer functions as the loudspeaker, for example, the hand-free mode loudspeaker of a mobile phone, it may play an output sound So of an output electrical signal Eo, which may cause audible echoes. Once the electroacoustic transducer 410 changes to function as the microphone, the electroacoustic transducer 410 receives the input sounds Si of the echoes, and the echo analysis unit 422 of the present invention immediately analyzes the echoes, for example, by comparing the output electrical signal So with the related input electrical signal Si, and produces an echo electrical signal (not shown) for representing the echoes. In one embodiment, the echo electrical signal is then stored in a memory either separated from or integrated with the audio controller 320. Since, in most cases, the audio apparatus 400 remains in the same space with the same audio reflection pattern, the echo cancellation unit 424, coupled to the echo analysis unit 422, can further use the analyzed and stored echo electrical signal to cancel the echoes of subsequent input sounds received by the electroacoustic transducer 310 when functioning as a microphone.

(Fourth Embodiment)

Figure 5:
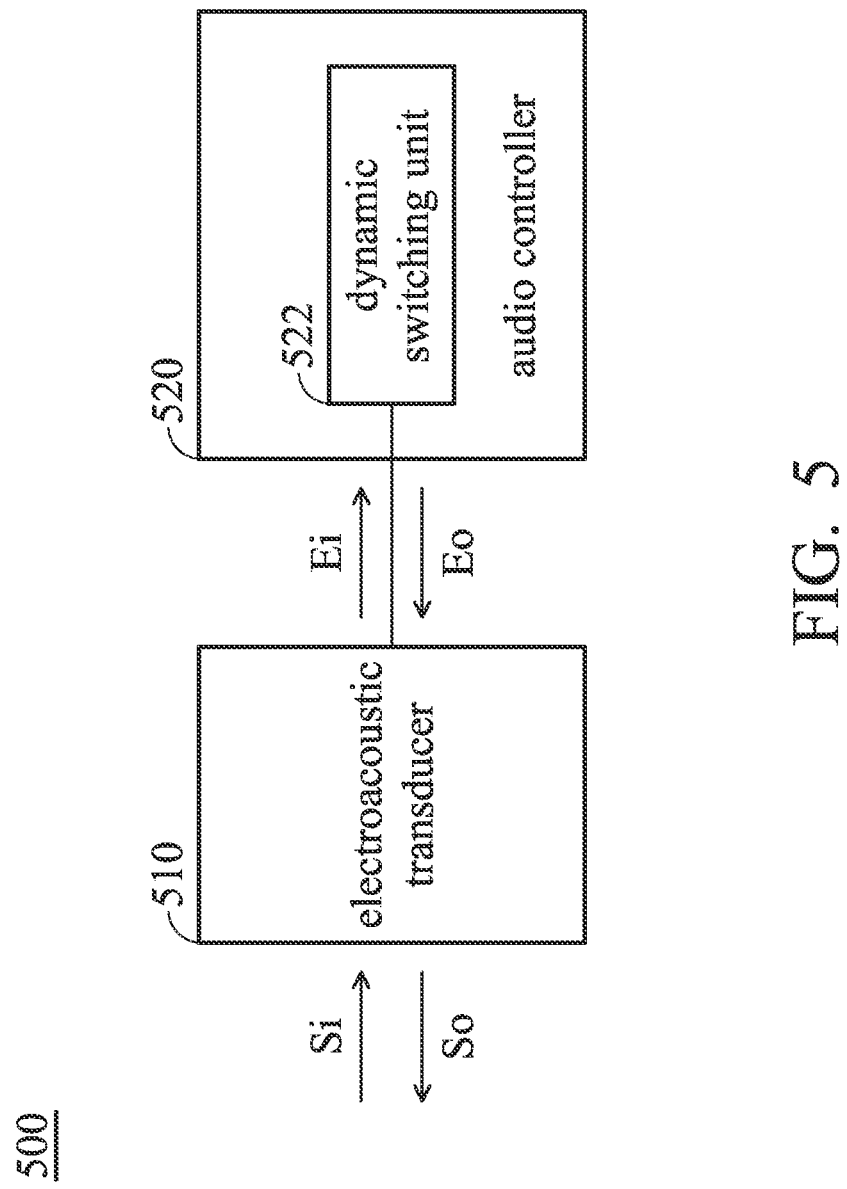
FIG. 5 is a schematic diagram of an audio apparatus according to a second embodiment of the present invention.

FIG. 5 is a schematic diagram of an audio apparatus according to a fourth embodiment of the present invention. The electroacoustic transducer 510 of the audio apparatus 500 also converts the output electrical signals Eo into the output sounds So, and converts the input sounds Si to the input electrical signals Ei.

In this embodiment, the audio controller 320 of the audio apparatus 500 further comprises a dynamic switching unit 522. The dynamic switching unit 524 is used for switching the electroacoustic transducer 510 to function as the loudspeaker when the electroacoustic transducer 510 receives the output electrical signals Eo, and, switching the electroacoustic transducer 510 to function as the microphone at the interval between two consecutive output electrical signals Eo. In an embodiment, the audio apparatus 500 is used as a hand-free mode speaker of a mobile phone through which a talker may give a speech. During the speech, there are many intervals among the output electrical signals Eo transmitted to the electroacoustic transducer 510 due to the speech-pause behavior of the talker. When the dynamic switching unit 522 of the present invention detects the intervals, it immediately switches the function of the electroacoustic transducer 510 from a loudspeaker to a microphone, and the electroacoustic transducer 510 may receive ambient sounds of the mobile phone for further use, such as voice recording, spectrum calibration, or noise/echo estimation and cancellation. In other embodiments, for performing spectrum estimation, calibration or noise/echo estimation and cancellation, the audio controller 520 may further comprises the spectral estimation unit 222, the spectral calibration unit 224, the noise estimation unit 322, the noise subtraction unit 324, the echo analysis unit 422, or the echo cancellation unit 424 which has been described in the previous embodiments.

(Fifth Embodiment)

Figure 6:
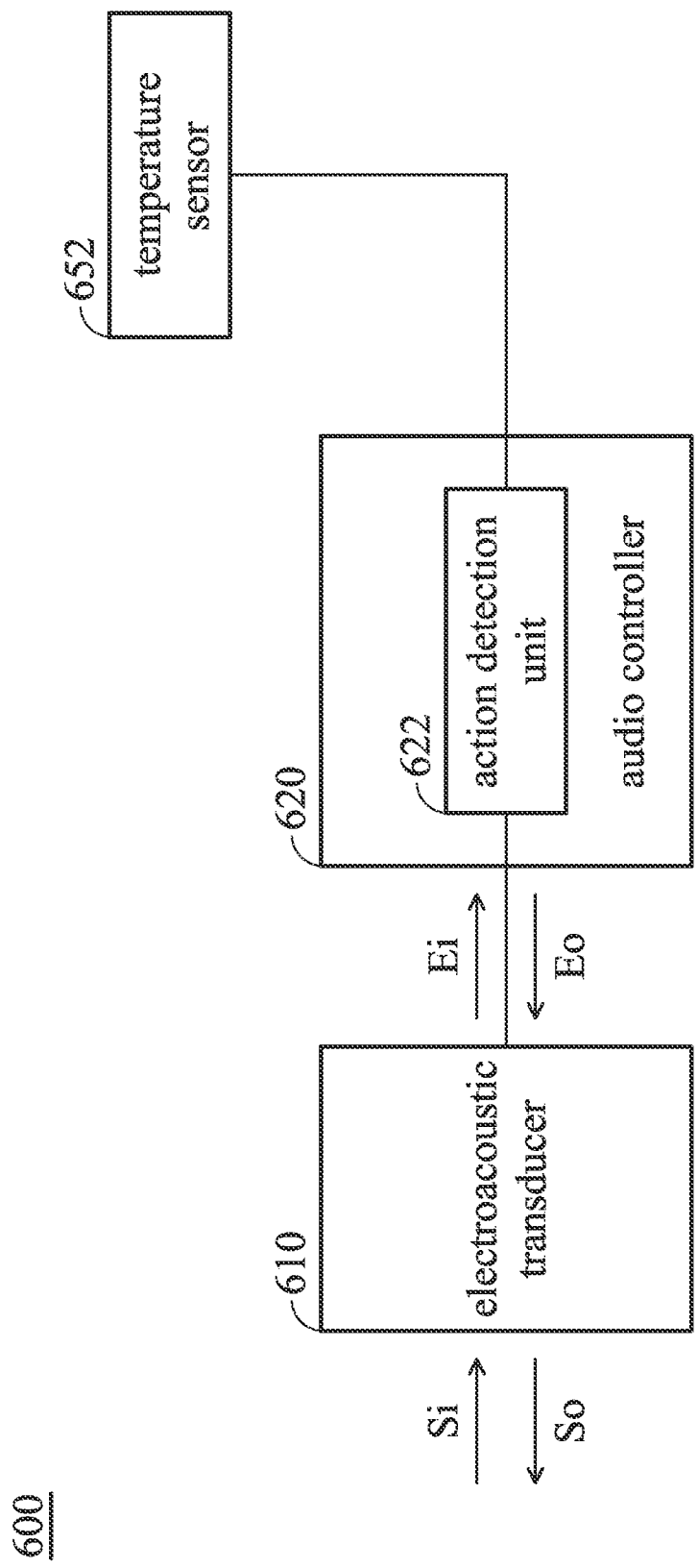
FIG. 6 is a schematic diagram of an audio apparatus according to a second embodiment of the present invention.

FIG. 6 is a schematic diagram of an audio apparatus according to a fifth embodiment of the present invention. The electroacoustic transducer 610 of the audio apparatus 600 also converts the output electrical signals Eo into the output sounds So, and converts the input sounds Si to the input electrical signals Ei.

In this embodiment, the audio controller 620 of the audio apparatus 600 further comprises an action detection unit 622 for detecting an action of a user, and the audio controller 620 controls whether the electroacoustic transducer 610 functions as a loudspeaker or a microphone based on the action. In an embodiment, the audio apparatus 600 is used as a hand-free mode speaker of a mobile phone, and the action detection unit 622 may be further coupled to a temperature sensor 652 which is mounted on the handset of the mobile phone for determining whether an object with body temperature, for example, the user's ear, is close to the handset of the mobile phone. When determining that the user's ear is close to the handset (i.e., receiver), the hand-free mode speaker is turned off and the handset mode speaker is turned on, and the audio controller 620 of the present invention will switch the function of the electroacoustic transducer 610 from being a loudspeaker to being a microphone based on the determination of the action detection unit 622. Then, the electroacoustic transducer 610 may receive ambient sounds of the mobile phone for further use, such as voice recording, spectrum calibration, or noise/echo estimation and cancellation. In other embodiments, for performing spectrum estimation, calibration or noise/echo estimation and cancellation, the audio controller 620 may further comprises the spectral estimation unit 222, the spectral calibration unit 224, the noise estimation unit 322, the noise subtraction unit 324, the echo analysis unit 422, or the echo cancellation unit 424 which has been described in the previous embodiments. In addition, the said temperature sensor 652 can be replaced by other sensors, such as sensors sensitive to light, motion, magnetic fields, gravity, humidity, vibration, pressure, electrical fields, sound, and other physical aspects of the external environment, and the combination of the sensors.

Although, as discussed above, the audio apparatus of the present invention may be used in a mobile phone, the present invention should not be limited thereto. While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio apparatus, comprising:
   an electroacoustic transducer; and
   an audio controller, coupled to the electroacoustic transducer, for actively controlling the electroacoustic transducer to function as a loudspeaker or a microphone, wherein the loudspeaker converts output electrical signals to output sounds, and the microphone converts input sounds to input electrical signals;
   wherein the audio controller further comprises:
   a dynamic switching unit for:
   switching the electroacoustic transducer to function as the loudspeaker when the electroacoustic transducer receives the output electrical signals; and
   switching the electroacoustic transducer to function as the microphone at the interval between two consecutive output electrical signals.

2. The audio apparatus as claimed in claim 1, wherein the audio controller further comprises:
   a spectral estimation unit for estimating the frequency spectrum of the input electrical signals converted from the input sounds when the electroacoustic transducer functions as a microphone.

3. The audio apparatus as claimed in claim 2, wherein the audio controller further comprises:
   a spectral calibration unit, coupled to the spectral estimation unit, for calibrating the frequency spectrum of the input electrical signals based upon a predetermined spectral characteristic.

4. The audio apparatus as claimed in claim 3, further comprising:
   a memory, coupled to the audio controller, for pre-storing the predetermined spectral characteristic.

5. The audio apparatus as claimed in claim 1, wherein the audio controller further comprises:
   a noise estimation unit for estimating ambient noises from the input sounds and producing noise electrical signals representing the ambient noises when the electroacoustic transducer functions as the microphone.

6. The audio apparatus as claimed in claim 5, wherein the audio controller further comprises:
   a noise subtraction unit, coupled to the noise estimation unit, for subtracting the noise electrical signals from the input electrical signals.

7. The audio apparatus as claimed in claim 5, further comprising:
   a memory, coupled to the audio controller, for storing the noise electrical signals.

8. The audio apparatus as claimed in claim 1, wherein the audio controller further comprises:
   an echo analysis unit for analyzing echoes of the output sounds of the output electrical signals and producing echo electrical signals representing the echoes once the electroacoustic transducer changes to function as the microphone.

9. The audio apparatus as claimed in claim 8, wherein the audio controller further comprises:
   an echo cancellation unit for using the echo electrical signals to cancel the echoes of the input sounds when the electroacoustic transducer functions as the microphone.

10. The audio apparatus as claimed in claim 8, further comprising:
    a memory, coupled to the audio controller, for storing the echo electrical signals.

11. An audio controller, coupled to an electroacoustic transducer, for actively controlling the electroacoustic transducer to function as a loudspeaker or a microphone, wherein the loudspeaker converts output electrical signals to output sounds, and the microphone converts input sounds to input electrical signals;
    wherein the audio controller further comprises a dynamic switching unit for:
    switching the electroacoustic transducer to function as the loudspeaker when the electroacoustic transducer receives the output electrical signals; and switching the electroacoustic transducer to function as the microphone at the interval between two consecutive output electrical signals.

12. The audio controller as claimed in claim 11 further comprising:
a spectral estimation unit for estimating the frequency spectrum of the input electrical signals converted from the input sounds when the electroacoustic transducer functions as a microphone.

13. The audio controller as claimed in claim 12 further comprising:
a spectral calibration unit, coupled to the spectral estimation unit, for calibrating the frequency spectrum of the input electrical signals based upon a predetermined spectral characteristic.

14. The audio controller as claimed in claim 13 further comprising:
a memory, coupled to the audio controller, for pre-storing the predetermined spectral characteristic.

15. The audio controller as claimed in claim 11 further comprising:
a noise estimation unit for estimating ambient noises from the input sounds and producing noise electrical signals representing the ambient noises when the electroacoustic transducer functions as the microphone.

16. The audio controller as claimed in claim 15 further comprising:
a noise subtraction unit, coupled to the noise estimation unit, for subtracting the noise electrical signals from the input electrical signals.

17. The audio controller as claimed in claim 15 further comprising:
a memory, coupled to the audio controller, for storing the noise electrical signals.

18. The audio controller as claimed in claim 11 further comprising:
an echo analysis unit for analyzing echoes of the output sounds of the output electrical signals and producing echo electrical signals representing the echoes once the electroacoustic transducer changes to function as the microphone.

19. The audio controller as claimed in claim 18 further comprising:
an echo cancellation unit for using the echo electrical signals to cancel the echoes of the input sounds when the electroacoustic transducer functions as the microphone.

20. The audio controller as claimed in claim 18 further comprising:
a memory, coupled to the audio controller, for storing the echo electrical signals.

* * * * *